(12) United States Patent
Wray

(10) Patent No.: US 7,283,485 B2
(45) Date of Patent: Oct. 16, 2007

(54) COMMUNICATION SYSTEM

(75) Inventor: Stuart C Wray, Broadstone (GB)

(73) Assignee: Ericsson AB, Stockholm (SE)

( * ) Notice: Subject to any disclaimer, the term of this patent is extended or adjusted under 35 U.S.C. 154(b) by 867 days.

(21) Appl. No.: 10/275,611

(22) PCT Filed: May 1, 2001

(86) PCT No.: PCT/GB01/01896

§ 371 (c)(1),
(2), (4) Date: Jun. 3, 2003

(87) PCT Pub. No.: WO01/86874

PCT Pub. Date: Nov. 15, 2001

(65) Prior Publication Data

US 2004/0100971 A1    May 27, 2004

(30) Foreign Application Priority Data

May 9, 2000    (GB) ................................ 0011021.3

(51) Int. Cl.
*H04L 12/42* (2006.01)
(52) U.S. Cl. ........................ 370/254; 370/408; 370/451
(58) Field of Classification Search ................ 370/252, 370/223, 352, 403, 366, 460, 421, 376, 217, 370/216, 254, 408, 451, 459; 359/119, 124, 359/161
See application file for complete search history.

(56) References Cited

U.S. PATENT DOCUMENTS 4,697,268 A * 9/1987 Desyllas et al. ............ 714/717
4,881,074 A * 11/1989 Reichbauer et al. ........ 370/258
5,390,326 A    2/1995 Shah ........................... 395/575
5,561,769 A    10/1996 Kumar et al.
6,532,088 B1 * 3/2003 Dantu et al. .................. 398/43
6,574,197 B1 * 6/2003 Kanamaru et al. .......... 370/252

FOREIGN PATENT DOCUMENTS

JP    5-342774    12/1993

OTHER PUBLICATIONS

*Computer Networks*, Computer Networks, North Holland, Amsterdam, NL., Andrew S. Tanenabum, pp. 183-190, 287, 730-744.
*Implementation of On-Line Distributed System-Level Diagnosis Theory*, IEEE Transactions on Computers, 41 May 1992, No. 5, New York, pp. 616-626, Ronald P. Bianchini, Jr.
*Distributed Diagnosis Protocol*, Microprocessing and Microprogramming, 38 Sep. 1993, No. 1/5, Amsterdam, NL, Luis Moura Silva, et al., pp. 171-178.

* cited by examiner

Primary Examiner—Chau Nguyen
Assistant Examiner—Kenneth R Hartmann
(74) Attorney, Agent, or Firm—Kirschstein, et al.

(57) ABSTRACT

A communications system in which a first node is connected to a plurality of second nodes for controlling the operation of the second nodes. The plurality of second nodes is arranged in one or more logical interconnects, the topology of the one or more logical interconnects being distinct from the topology of the physical interconnection of the nodes. Each second node sends status messages to its logical successor node and monitors the status messages received from its logical predecessor node for determining the status thereof.

9 Claims, 2 Drawing Sheets

COMMUNICATION SYSTEM

The present invention is related to the field of communications systems (including distributed computing systems) and, in particular, to a system for dealing with failure of a node (or computer) in such a communications system.

In distributed computing systems a plurality of interconnected computers each run a portion of an application program. The whole application program is implemented by a distributed software system run concurrently on the plurality of interconnected computers. The computers form nodes that are interconnected by a communications system (e.g. as hosts in an internet protocol (IP) network). In a resilient distributed system, the failure of one or more of the component computers can be tolerated by the application, and recovered from by substituting another computer (e.g. a completely unused spare or a currently used computer with spare capacity) and loading it with appropriate code and data so that it can take over the role of the failed computer in the distributed computation. The configuration of a resilient distributed computing system is hence subject to change and is controlled by a management system.

An example of a resilient system is given in U.S. Pat. No. 5,390,326 to SHAH. SHAH teaches a communications network in which each node sends status messages and monitors the status messages sent by each other node. If an error is detected, i.e. an expected status message is not received in time, each node that has detected the error reports this to a master node.

The management system, typically located in a further computer, is responsible for supervising the operation of the computers running the distributed application, and for supervising the operation of the distributed application itself. The management system will thus be involved in introducing any new computers into the collection of computers running the distributed application (for example to increase the total processing capacity) and in retiring computers from this collection as necessary (for example for hardware upgrade or replacement). The management system will also be involved in the configuration of the distributed application, and may control which computers are assigned to particular processing tasks and how the processing load is distributed across the collection of computers. When a failure of one of this collection of computers occurs, the management system must notice this and reconfigure the computers and the distributed application to take account of this.

There is therefore a need to efficiently detect the failure of a computer in such a distributed system. One possible solution to this problem is for the management system to periodically "ping" each of the application computers by sending it an Internet Control Message Protocol (ICMP) echo request message. ICMP is used for reporting errors in message delivery, redirecting traffic and so on. The ICMP echo request message (usually known as a "ping") requests that the receiving computer immediately replies with an ICMP echo reply message ("ping reply"). This is used to determine whether remote computers are functioning reasonably correctly, and whether a usable network path is available to such remote computers (i.e. if the computer has access to a usable path to reach any other computer it needs to reach). Computers with functioning IP interfaces are required to reply to these messages with ICMP echo reply messages. This happens at a low level in the operating system, and is the method commonly used to establish whether a computer is working or not. Internet Engineering Task Force publication RFC 1122 "Host Requirements" October 1989 describes ICMP operation (see section 3.2.2.6, pp 42-43).

By sending these messages frequently (for example more than once a second) the management system verifies the functioning of each of the application computers. Should reply not be received in due time this indicates that a computer may have failed. However, messages can be lost in the network so this is not totally reliable. Should several replies fail to arrive, then computer failure may be predicted with greater confidence, however, network failure is another possibility and should be explored as part of the recovery process. If replies are being received from computers neighbouring the supposedly failed computer, then it is reasonable to suppose that the failure is in the suspect computer, whereas if no replies are being received from a number of neighbouring computers, then it is reasonable to suppose that the network itself has failed.

Rather than the application computers being "pinged" (using ICMP echo request messages) by the management system an alternative solution is for the application computers themselves to periodically send a message to the management system (not necessarily an ICMP message) announcing that they are still alive. Again, absence of several such expected messages would be an indication of the failure of an application computer.

Unfortunately, both the above solutions suffer from the same problem: namely that although the load on each of the application computers is quite small, the management system will experience a much higher load, since it has to exchange network traffic with every one of the application computers (of which there may be a large number). This traffic will degrade the ability of the management system to perform other tasks and may be the key factor in constraining the size of the whole system, or dictating that failure recovery takes a longer time than desired.

The present invention provides a communications system comprising a first node and a plurality of second nodes; in which the first node is connected to the plurality of second nodes for controlling the operation of the second nodes; in which the plurality of second nodes are physically interconnected; in which the plurality of second nodes are arranged in one or more logical interconnects; in which the topology of the one or more logical interconnects is distinct from the topology of the physical interconnection; in which each second node comprises means for sending status messages to its logical successor second node and means for monitoring status messages received from its logical predecessor second node for determining the status thereof; in which each second node comprises application data and means for exchanging the application data with its logical successor node in the form of application messages in which at least some of the application messages function as status messages.

According to a preferred embodiment, the present invention provides a system in which each second node comprises means for periodically sending a control message to its logical predecessor second node for requesting a status message therefrom and means for detecting receipt of control messages from its logical successor node and for sending, in response to the or each detected received control message, a status message to its logical successor node.

According to a preferred embodiment, the present invention provides a system in which each second node comprises means for monitoring the or each status message received and for identifying an error condition if a pre-set number of valid status messages are not received from the logical predecessor node within a pre-set period.

Embodiments of the present invention will now be described by way of example with reference to the drawings in which.

Figure 1:
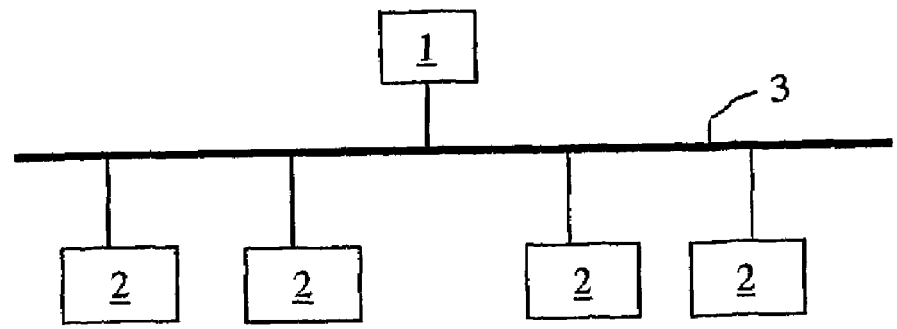
FIG. 1 shows a distributed computing system according to the prior art.

FIG. 1 shows an IP Network in which a management system (i.e. a software system running on a management computer) is provided at a management node 1 and is connected by means of an IP network 3 to a plurality of application computers each provided in a different one of a plurality of second nodes 2. The IP network comprises a connection medium (e.g. copper, optical fibre or radio) arranged, for example, in a star, tree, bus or mesh configuration or amorphously, e.g. in the case of a radio network. In practice the IP network will typically be a combination of some or all of these media arrangements joined together.

Figure 2:
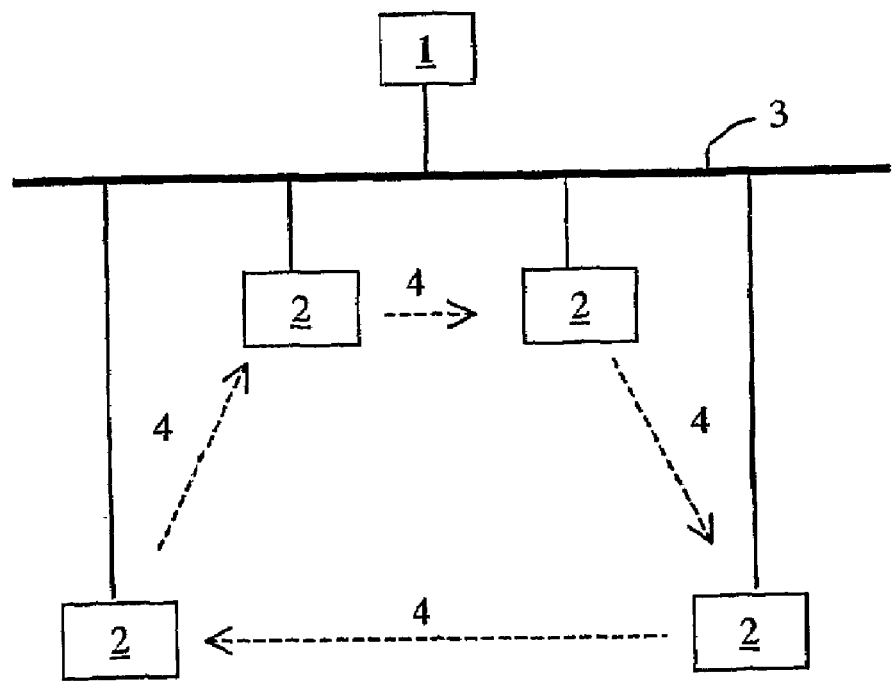
FIG. 2 shows a distributed computing system arranged in a logical ring according to the present invention.

FIG. 2 shows a distributed computing system with the same physical topology as the system of FIG. 1. However, the second nodes 2 are now arranged in a logical ring as indicated by arrows 4. Arrows 4 indicate a flow direction for status messages around the logical ring.

In FIG. 2, the physical arrangement and connectivity of the computers has not been altered from that of FIG. 1. However, each of the application computers in second nodes 2 is now modified with software which is configured by the management system so that each application computer knows of its logical successor (i.e. the next computer in line around the logical ring in the direction of the arrows 4) to which it is required to send status messages and of its logical predecessor (i.e. the next computer in line around the logical ring in the opposite direction) from which it expects to receive status messages. Note that the logical ring topology (i.e. the arrangement of logical connections between the computers) is different from the physical topology (i.e. the arrangement of physical connections between the computers).

According to the embodiment of FIG. 2, each application computer now periodically sends an ICMP echo request message to its logical predecessor in the ring and awaits an ICMP echo reply message therefrom. The reply will pass around the logical ring in the opposite sense to the flow of the echo request message. If a valid reply is received within a pre-set time period, all is well. If not, the computer sending the ICMP echo request message will inform the management system (using a suitable protocol) that its predecessor node appears to have failed. A suitable protocol for this is, for example, the Simple Network Management Protocol (SNMP) published by the Internet Engineering Task Force in RFC 1155 "Structure of Management Information (SMI)" May 1990 and RFC 1157 "Simple Network Management Protocol (SNMP)" May 1990—in particular the "Trap" operation of that protocol, which is used by a managed computer to attract the attention of a management system and optionally deliver some interesting data to the management system. Each application computer thus acts as an overseer for another specific application computer and although a computer cannot generate a message to alert the management system to its own failure, its overseer which is still functioning correctly can generate such a message. The management system also implements an "enrollment" protocol (typically using SNMP), whereby it informs newly started host computers of their place in the ring, and adjusts the predecessor-successor relationship of existing hosts in the ring, both to facilitate the entry of new hosts and to allow the controlled retirement (e.g. for hardware upgrade or replacement) of existing hosts. This process is closely synchronised with the start-up and shut-down of the distributed applications on these host computers.

Advantageously, the present invention avoids the routine sending of periodic monitoring messages to the management system. In fact there is no extra load on the management system when all the nodes are working (which is almost all the time). A cheaper, less powerful computer may thus be perfectly adequate for this management role.

The network according to the present invention viewed as a whole carries the same number of messages as in the previous solutions. However, in practice a network will be composed of a number of "local" sub-networks, and in that case the traffic round the virtual ring will largely comprise traffic that terminates within the same sub network that it originated in and will be distributed evenly between those sub-networks. As a result the traffic loading around the network is now much improved. Thus, because of the structure of IP networks and their supporting underlying networks in the communications system, most of the request messages according to the present invention and the corresponding replies will typically be confined to only a part of the whole IP network and thus will impose little or no burden on computers or network infrastructure in other parts of the IP network (unlike the previous solutions where all failure detection traffic from every application computer had to converge on a single point, i.e. the management system).

Because of this, the system as a whole is now scalable. Whereas the previous solutions had a performance bottleneck in the management system which meant that, when the capacity of the bottleneck was reached, the whole system could grow no more, in the system according to the present invention each computer has only a small failure-detection related load and, as the per-computer load does not grow with the number of application computers, there is no such limit on the size of the system.

Figure 3:
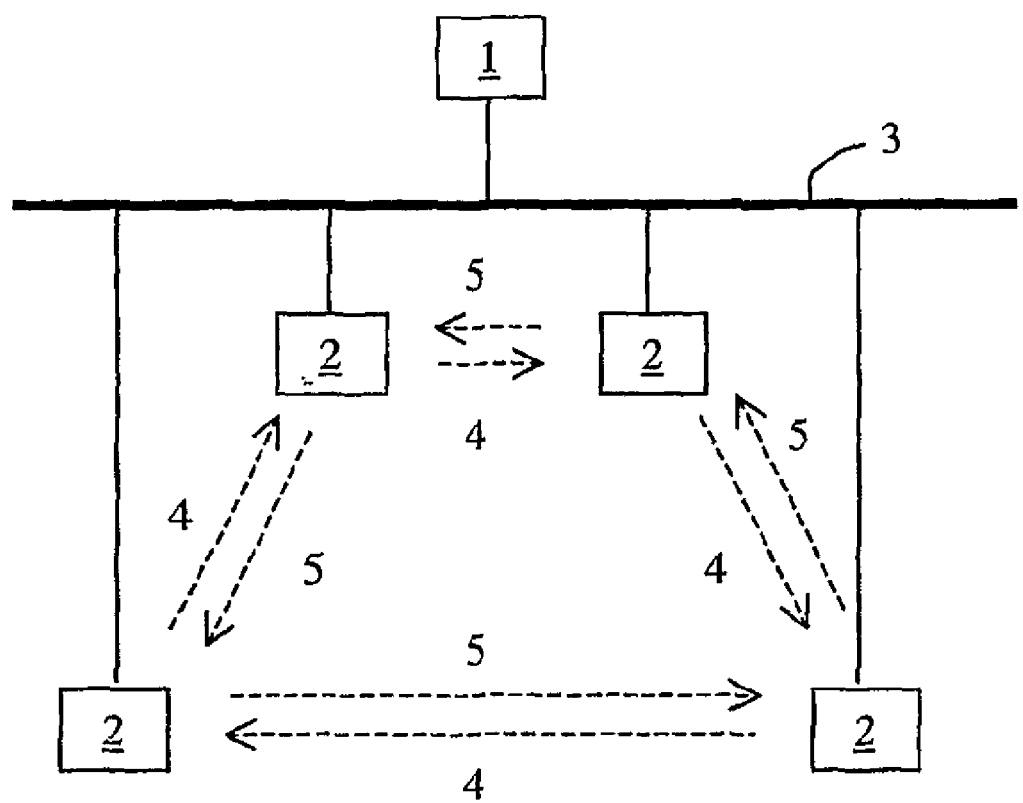
FIG. 3 shows a bi-directional logical ring according to the present invention.

According to a further embodiment of the present invention, as shown in FIG. 3, the logical ring operates in a bi-directional way, as indicated by arrows 4, 5. According to the embodiment of FIG. 3, each application computer now periodically sends an ICMP echo request message to both its logical successor and logical predecessor in the ring and awaits an ICMP echo reply message therefrom. The reply will typically pass around the logical ring in the opposite sense to the direction of the corresponding echo request messages. As can be seen from FIG. 3, both nodes logically adjacent to a further node (around the logical ring) will now monitor that further node and detect if it fails. If failure of a node is detected, the logically adjacent nodes will independently inform the management system. Thus this embodiment has the advantage of increased reliability as it will be easier for the management system to distinguish between actual node failure as opposed to mere message loss.

According to a further embodiment, communication between the two nodes checking on the same further node allows the status of the further node to be established with greater confidence before notifying the management system.

According to a further embodiment, each second node contains application data and application messages are used for transferring the application data between nodes as a way to protect against loss of the data in the case of failure of part of the distributed system. According to this embodiment the application messages are used rather than ICMP to solicit a response from destination nodes and are normally acknowledged by the destination node using the logical ring structure. If no data needs to be exchanged (i.e. if there has been no change of state) over a certain time interval, null application messages or conventional echo request messages will be sent.

As an alternative to the sending of a request message and waiting for a valid reply, each node could merely send status messages on a regular basis, as above, to its logical successor and monitor status messages received from its logical predecessor.

The status messages may contain information relating to the status of the originating node or, alternatively, the mere arrival of a status message may be used as an indication of the status of the originating node.

The structure of the logical ring and, in particular, the order in which the second nodes are arranged around the logical ring is not restricted in any way by the physical arrangement and interconnection of the nodes.

According to a further embodiment of the present invention, the plurality of second nodes may be arranged in a logical interconnect in a form other than a ring, i.e. in some form of mesh or other arrangement. The identity of the logical successor and logical predecessor to each second node will then be as assigned on setting up the logical interconnect. The logical interconnect topology (i.e. the arrangement of logical connections between the computers) is different from the physical topology.

The invention claimed is:

1. A communications system, comprising:
   a) a first node;
   b) a plurality of second nodes;
   c) the first node being connected to the plurality of second nodes for controlling operation of the second nodes;
   d) the plurality of second nodes being physically interconnected in a topology;
   e) the plurality of second nodes being arranged in one or more logical interconnects having a topology which is distinct from the topology of the physical interconnection;
   f) each second node including means for identifying a corresponding logical successor node and a logical predecessor node;
   g) each second node including means for sending status messages to its logical successor node, and means for monitoring the status messages received from its logical predecessor node for determining a status thereof; and
   h) each second node including application data, and means for exchanging the application data with its logical successor node in the form of application messages in which at least some of the application messages function as status messages.

2. The system as claimed in claim 1, in which each second node includes means for sending the status messages to its logical successor node at pre-set intervals.

3. The system as claimed in claim 1, in which each second node includes means for periodically sending a control message to its logical predecessor node for requesting a status message therefrom, and means for detecting receipt of control messages from its logical successor node and for sending, in response to the detected received control message, a status message to its logical successor node.

4. The system as claimed in claim 3, in which each second node includes means for exchanging the application data in the form of the application messages with its logical predecessor node in which at least some of the application messages function as control messages.

5. The system as claimed in claim 1, in which each second node includes means for monitoring the status message received and for identifying an error condition if a pre-set number of valid status messages is not received from the logical predecessor node within a pre-set period.

6. The system as claimed in claim 1, in which each second node includes means for informing the first node of a status of the logical predecessor node of the second node.

7. The system as claimed in claim 1, in which at least one of the logical interconnects comprises the first node.

8. The system as claimed in claim 1, in which at least one of the logical interconnects comprises a logical ring.

9. The system as claimed in claim 1, in which the system comprises an internet protocol (IP) network.

* * * * *

UNITED STATES PATENT AND TRADEMARK OFFICE
CERTIFICATE OF CORRECTION

PATENT NO. : 7,283,485 B2
APPLICATION NO. : 10/275611
DATED : October 16, 2007
INVENTOR(S) : Wray It is certified that error appears in the above-identified patent and that said Letters Patent is hereby corrected as shown below:

On the Face Page, in Field (54), in Title, in Column 1, Line 1, delete "COMMUNICATION" and insert -- COMMUNICATIONS --, therefor.

On the Face Page, in Field (56), under "OTHER PUBLICATIONS", in Column 2, Line 1, delete "Computer Networks," before "North".

In Column 1, Line 1, delete "COMMUNICATION" and insert -- COMMUNICATIONS --, therefor.

Signed and Sealed this

Thirteenth Day of January, 2009

JON W. DUDAS
*Director of the United States Patent and Trademark Office*